US011910086B1

(12) United States Patent
Liao et al.

(10) Patent No.: US 11,910,086 B1
(45) Date of Patent: Feb. 20, 2024

(54) SMALL FORM FACTOR ACTIVE ILLUMINATION PRIVACY SHUTTER

(71) Applicant: Dell Products L.P., Round Rock, TX (US)

(72) Inventors: Chien-Chih Liao, Taipei (TW); Chih-Hao Kao, New Taipei (TW); Ghee Beng Ooi, Singapore (SG); Yi-Hsien Lin, Taipei (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/875,951

(22) Filed: Jul. 28, 2022

(51) Int. Cl.
H04N 23/667 (2023.01)
H04N 23/55 (2023.01)
H04N 23/57 (2023.01)

(52) U.S. Cl.
CPC ........... *H04N 23/667* (2023.01); *H04N 23/55* (2023.01); *H04N 23/57* (2023.01)

(58) Field of Classification Search
CPC ........ H04N 23/50; H04N 23/55; H04N 23/56; H04N 23/57; H04N 23/667; G03B 11/043; G03B 11/06; G03B 17/12
See application file for complete search history.

(56) References Cited

U.S. PATENT DOCUMENTS

| 8,045,042 | B2 | 10/2011 | Mogi |
| 8,325,265 | B2 | 12/2012 | Chen |
| 8,717,486 | B2 | 5/2014 | Kosaka et al. |
| 9,992,404 | B2 | 6/2018 | Monkiewicz et al. |
| 2008/0143868 | A1 | 6/2008 | Tsuchiya et al. |
| 2011/0026148 | A1 | 2/2011 | Tanimura et al. |
| 2018/0316835 | A1* | 11/2018 | Files ............... H04N 23/57 |
| 2019/0042769 | A1* | 2/2019 | Sukhomlinov ..... G06F 21/6245 |
| 2021/0200294 | A1* | 7/2021 | Tam ................. G06F 21/74 |

FOREIGN PATENT DOCUMENTS

WO 2005119330 A1 12/2005

* cited by examiner

*Primary Examiner* — Daniel M Pasiewicz
(74) *Attorney, Agent, or Firm* — ZAGORIN CAVE LLP; Robert W. Holland

(57) ABSTRACT

An information handling system camera captures visual images of light directed by a lens towards an image sensor. The camera has an active illumination privacy shutter that disables the image sensor from capturing visual images by introducing illumination between the lens and image sensor, such as with a red light emitting diode that is seen as a red dot at the lens when viewed from in front of the camera. In one embodiment, the illumination is directed towards a light diffuser, such as a sheet of acrylic, that extends between the lens and image sensor when the camera is commanded to a privacy mode.

17 Claims, 4 Drawing Sheets

SMALL FORM FACTOR ACTIVE ILLUMINATION PRIVACY SHUTTER

CROSS REFERENCE TO RELATED APPLICATIONS

This application is related to U.S. patent application Ser. No. 17/875,946, filed Jul. 28, 2022, entitled "Camera with Plural Selective Fields of View," naming Chih-Hao Kao, Ghee Beng Ooi, and Yi-Hsien Lin as inventors, which application is incorporated herein by reference.

BACKGROUND OF THE INVENTION

Field of the Invention

The present invention relates in general to the field of information handling system cameras, and more particularly to an information handling system camera small form factor active illumination privacy shutter.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems process information with processing components that cooperate to execute instructions of an operating system or application. Desktop information handling systems built in a stationary housing generally interact with end users through peripheral devices, such as peripheral display, keyboard and mouse. Portable information handling systems can interact with peripheral devices but also typically integrate a keyboard, display and a power source in a portable housing to support mobile operations. Portable information handling systems allow end users to carry a system between meetings, during travel, and between home and office locations so that an end user has access to processing capabilities while mobile. Portable information handling systems often also include an integrated camera to capture visual images, such as in support of a video conference. Generally, desktop information handling systems use peripheral cameras that couple to or integrate with a peripheral display. Cameras that integrate into portable or display housings tend to have a small form factor since the portable and display housings tend to have a minimal thickness.

One difficulty that arises with the use of peripheral cameras is that an unauthorized user or malicious actor can gain control of a camera and spy on an end user. To help manage this risk, cameras are typically equipped with a shutter that closes off the lens of the camera from accepting external light. In some instances, these privacy shutters are integrated in the camera front face, such as with an iris structure that is activated by an internal actuator. These types of mechanical devices tend to add cost and complexity to the camera and also increase the camera form factor in order to fit the shutter within the camera housing. Other privacy cameras are simple mechanical doors that an end user physically moves across the lens to block external light from entering the lens. A difficulty with such privacy shutters is that an end user must remember to cover and uncover the lens for each camera use. In addition, these sliding doors have an inelegant appearance, also increase the size of the camera and add to the cost of the camera with additional parts.

SUMMARY OF THE INVENTION

Therefore, a need has arisen for a system and method which provides a privacy shutter with a low form factor and visual confirmation that the camera is secured against unauthorized capture of visual images.

In accordance with the present invention, a system and method are provided which substantially reduce the disadvantages and problems associated with previous methods and systems for securing a camera against unauthorized use. An illumination source provides illumination between the camera lens and image sensor to prevent the image sensor from capturing a visual image of light passing through the lens towards the image sensor. The illumination source light is visible through the lens as visual confirmation that the privacy shutter is protecting the camera from unauthorized capture of visual images.

More specifically, an information handling system processes information with a processor and memory that cooperate to execute instructions of an operating system and applications, such as to support a video conference. A camera captures visual images for communication to the information handling system with a lens that directs light towards an image sensor. When access to the camera is restricted, such as when an end user application has not authorized capture of visual images, an active illumination privacy shutter secures the camera against unauthorized capture of visual images by providing illumination from an illumination source between the lens and image sensor, such as with a red LED or red OLED material. The illumination prevents the image sensor from capturing visual images and provides illumination visible through the lens to an end user as an indication that the capture of visual images is disabled. In one embodiment, a diffuser, such as a sheet of acrylic, extends between the lens and image sensor and accepts illumination from the illumination source to block passage of external light passing through the lens and towards the image sensor.

The present invention provides a number of important technical advantages. One example of an important technical advantage is that a small form factor active illumination privacy shutter selectively secures a camera against unauthorized use and provides a visual confirmation of the privacy shutter implementation to an end user, such as by having illumination presented from the camera lens that also blocks capture of visual images by an image sensor. The active illumination shutter has a minimal footprint to readily fit in a portable information handling system camera or other types of cameras. The active illumination privacy shutter may be automatically implemented based upon conditions at an information handling system, such as the usage of different applications by an end user, or may be activated by an end user command.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system camera secures from unauthorized use with a small form factor active illumination privacy shutter. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
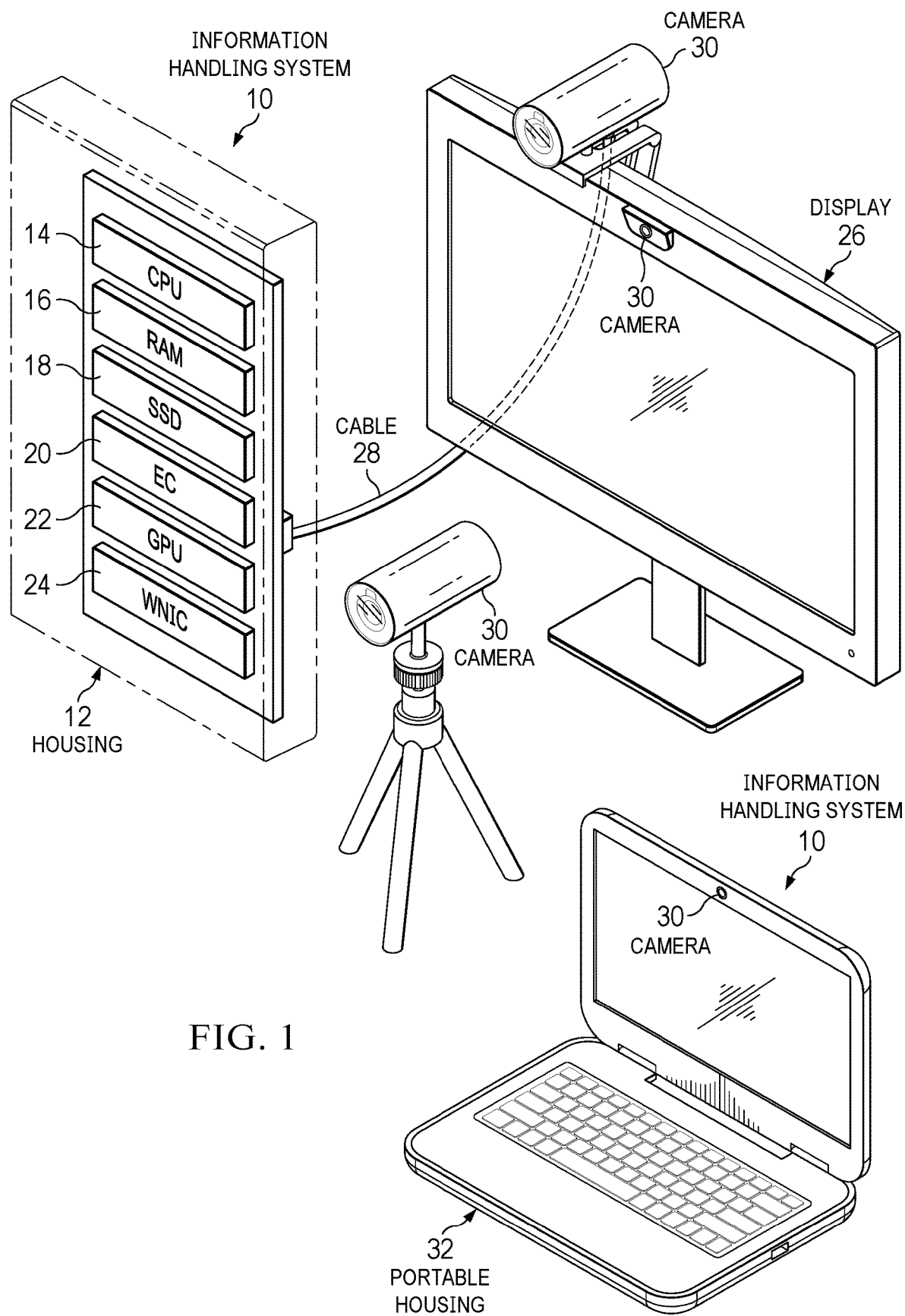
FIG. 1 depicts a block diagram of an information handling system having a camera that provides privacy with an active illumination privacy shutter.

Referring now to FIG. 1, a block diagram depicts an information handling system 10 having a camera 30 that provides privacy with an active illumination privacy shutter. The example embodiment depicts one example information handling system with a stationary housing 12 that processes information in cooperation with peripheral devices. A central processing unit (CPU) 14 executes instructions to process information in cooperation with a random access memory (RAM) 16 that stores the instructions and information. A solid state drive (SSD) 18 has persistent memory that provides non-transitory storage of information during system power down, such as an operating system and applications that execute on CPU 14. An embedded controller 20 executes firmware instructions to manage system operational conditions, such as application of power and maintenance of thermal constraints, and also manages CPU 14 interactions with peripheral devices, such as a keyboard, mouse and camera 30. A graphics processing unit (GPU) 22 interfaces with CPU 14 to further process information to define visual images for presentation at a display 26 interfaced through a display cable 28, such as by defining pixel values scanned to the display for presentation as colors. A wireless network interface controller 24 supports wireless communication between information handling system 10 and external devices, such as a wireless local area network (WLAN) and wireless personal area networks (WPAN) like Bluetooth. The example embodiment also depicts a portable information handling system 10 having similar processing components disposed in a portable housing to process information. The portable system includes an integrated display, keyboard and battery power source to operate in a mobile manner free of interfaces with fixed resources.

Information handling system 10 presents information as visual images at a display 26. As an example, a video conference application executing on CPU 14 receives video images of participants through a network and WNIC 24 and presents the video conference visual information at display 26. The video conference application leverages an operating system interface with a camera 30 to capture an image of the end user for communication through the network to other videoconference participants. In the example embodiment, a variety of cameras are available to support the video conference. For example, an integrated camera built into the housing of display 26 and portable housing 32 provides a convenient low profile camera. Alternatively, peripheral cameras may mount to the upper surface of display 26 or rest on a stand in the area of the display. During active use of a camera 30, the operating system or other applications of the information handling system activate the camera to capture visual images. When not in active use, camera 30 is turned off and has a privacy shutter activated to prevent unauthorized capture of visual images. Specifically, each camera 30 includes an active illumination privacy shutter that illuminates an illumination source within the camera to impede the capture of visual images by the camera, essentially blinding the camera's image sensor as described below in greater detail.

Figure 2:
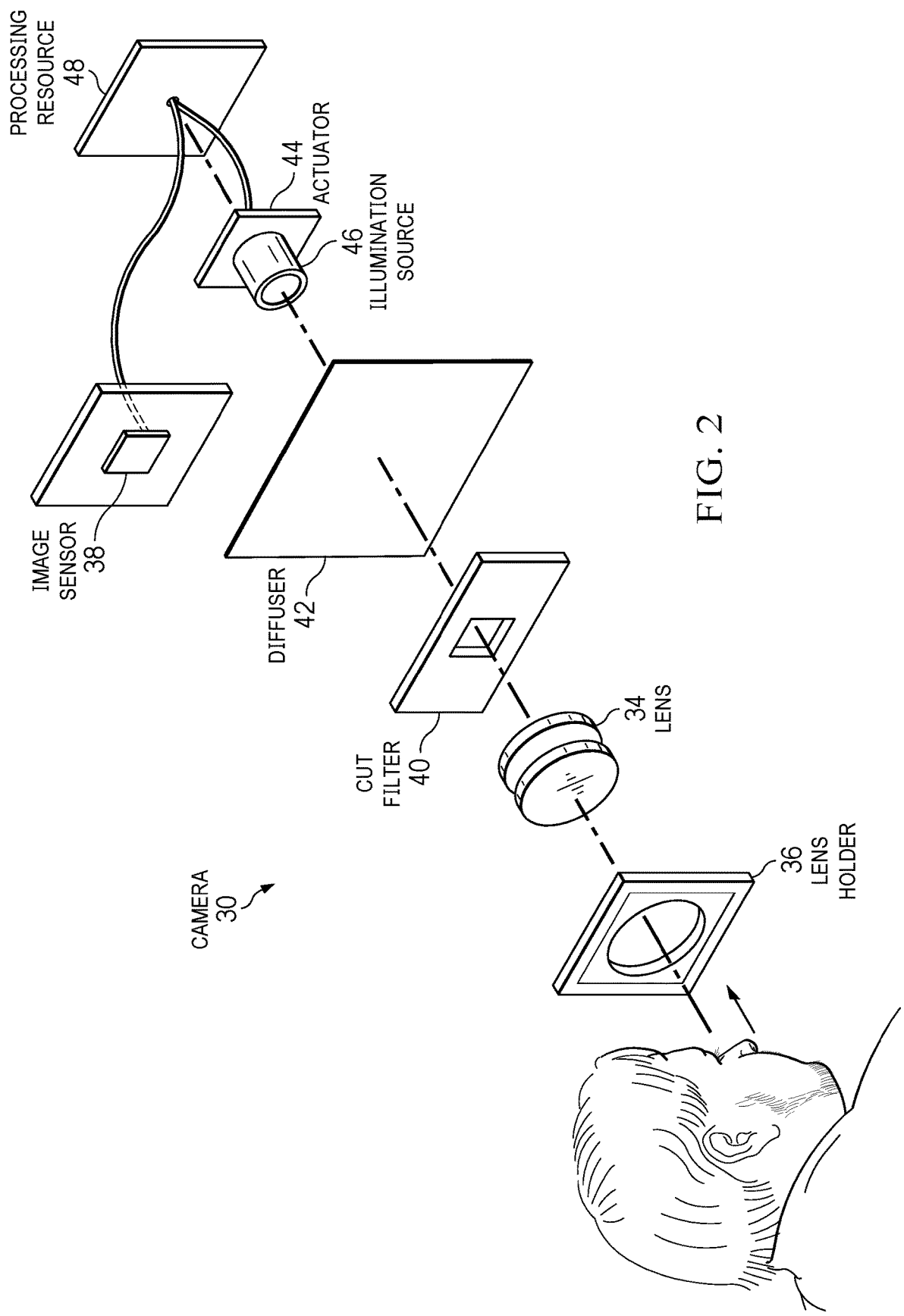
FIG. 2 depicts an exploded view of a camera having an active illumination privacy shutter.

Referring now to FIG. 2, an exploded view depicts a camera 30 having an active illumination privacy shutter. In the example embodiment, a lens holder 36 couples to lens 34 to hold the lens in position relative to an image sensor 38. Camera 30 captures visual images by directing light captured by lens 34 towards images sensor 38, which detects the light color and stores the visual image as an array of pixels in a conventional manner. A cut filter 40 is disposed between lens 34 and image sensor 38 and includes a diffuser 42, an actuator 44 and an illumination source 46 managed by a processing resource 48, such as an MCU. Cut filter 40 in a conventional camera might include an infrared filter that is selectively inserted or retracted to filter a light spectrum, such as infrared light. For instance, visual spectrum cameras that have an infrared capability sometimes include a cut filter to insert an infrared filter during daylight to help with image capture quality and to remove the infrared filter during low light operations so that an infrared image sensor can capture infrared images. Instead of having an infrared filter, a diffuser couples to actuator 44 to insert between lens 34 and image sensor 38 as a privacy shutter. Diffuser 42 is, for instance, a sheet of acrylic similar to that used for a liquid crystal display panel backlight and having a quality of spreading and dispersing illumination directed into it. When diffuser 42 is inserted between lens 34 and image sensor 38, illumination source 46 directs illumination into diffuser 42 to impede the passage of light from lens 34 to image sensor 38, thus preventing the capture of visual images by image sensor 38. In the example embodiment, illumination source 46 is a red light emitting diode (LED) directed towards diffuser 42 so that a red dot will appear when viewing the front of camera 30 through lens 34. In an alternative embodiment, red organic light emitting diode (OLED) material may be used instead of a red LED.

In operation, camera 30 detects when an authorized use is occurring, such as through a request by an application approved by an end user. When authorized use is detected, actuator 44 retracts diffuser 42 and illumination source 46 is turned off so that image sensor 38 can capture visual images. When an authorized use is not detected, camera 30 has the privacy shutter deployed to prevent unauthorized capture of visual images by image sensor 38. For instance, actuator 44 extends diffuser 42 between image sensor 38 and lens 34 and illumination source 46 is turned on to distribute red light through diffuser 42, thereby blocking the capture of visual images by image sensor 38. In addition, image sensor 38 may be powered down when the diffuser is extended and the red light turned on. An end user gets an indication that the camera has privacy enforced by the red light visible through lens 34, which also confirms disabling of image sensor 38. The red light indication helps to prevent an end user from mistakenly activating the camera with careless clicking of an authorized user because absence of the red light indicates an active camera. To further warn about the camera having an active state, a white LED or other indication may turn on when the camera image sensor is active. In the example embodiment, instructions to manage the privacy shutter are stored in flash memory of processing resource 48 and executed on processing resource 48, such as with GPIO interfaces to actuator 44, illumination source 46 and image sensor 38. In alternative embodiments, the instructions may reside in part or in full in an information handling system for execution by the information handling system processors.

Figure 3:
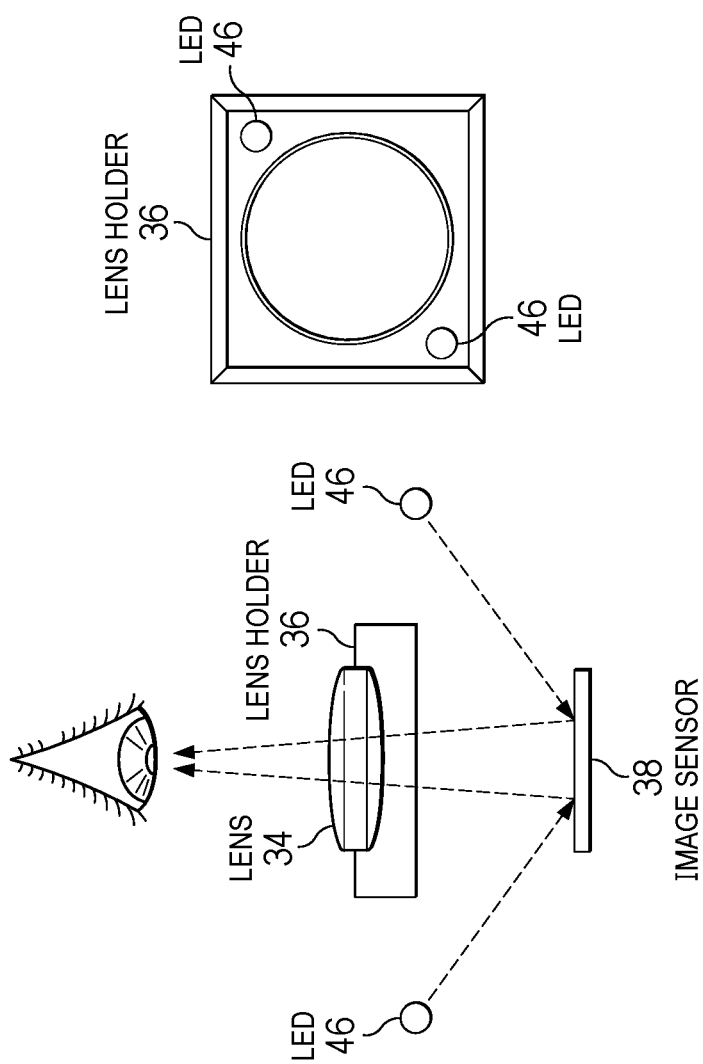
FIG. 3 depicts a side cutaway view of a camera having an active illumination privacy shutter.

Referring now to FIG. 3, a side cutaway view depicts a camera having an active illumination privacy shutter. In the example embodiment, illumination source 46 is a pair of red LEDs coupled to the inner surface of lens holder 36 and directed towards image sensor 38 so that illumination has sufficient brightness to prevent capture of visual images. Further, reflection from within the camera out lens 34 presents a red dot to an end user as an indication that the privacy shutter is on and preventing unauthorized use of the camera.

Figure 4:
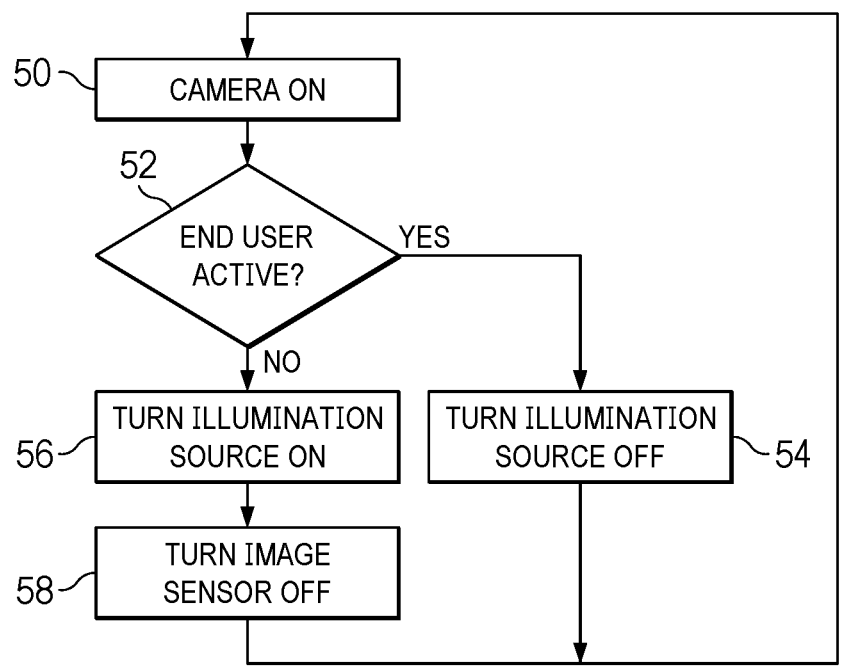
FIG. 4 depicts a flow diagram of a process for managing privacy of a camera with active illumination.

Referring now to FIG. 4, a flow diagram of a process for managing privacy of a camera with active illumination. The process starts at step 50 with a power on of the camera. At step 52 a determination is made of whether an end user is active and commanding use of the camera. If so, the image sensor is powered on to capture visual images and at step 54 the illumination source is turned off to allow capture of visual images by the camera, then the camera returns to step 50 to continue monitoring for authorized use of the camera. If at step 52 the end user is not active and authorizing use of the camera, the process continues to step 56 to turn on the illumination source and thereby block the capture of visual images by the image sensor by, essentially, blinding the image sensor. At step 58 the image sensor is powered off and the process returns to step 50 to monitor the camera for authorized use.

Although the present invention has been described in detail, it should be understood that various changes, substitutions and alterations can be made hereto without departing from the spirit and scope of the invention as defined by the appended claims.

What is claimed is:

1. An information handling system comprising:
 a processor operable to execute instructions to process information;
 a memory interfaced with the processor and operable to store the instructions and information;
 a display interfaced with the processor and operable to present the information as visual images; and
 a camera having a lens, an image sensor, an illumination source, a processing resource and a non-transient memory, the lens configured to direct light to the image sensor, the image sensor operable to capture a visual image of the light, the illumination source positioned between the lens and image sensor, the non-transient memory storing instructions that when executed on the processing resource cause the illumination source to illuminate in response to a predetermined condition thereby impeding the image sensor from capture of the visual image from the light directed through the lens, the camera further having a light diffuser having a planar shape and sized to impede light passing from the lens to the image sensor, an actuator coupled to the light diffuser and operable to selectively extend the light diffuser to an impeding position between the lens and image sensor and to retract the light diffuser from the impeding position, and instructions stored in the non-transitory memory that when executed on the processing resource causes the actuator to extend the light diffuser to the impeding position in response to the predetermined condition.

2. The information handling system of claim 1 further comprising:
 a lens holder coupled to the lens to hold the lens at a predetermined position relative to the image sensor;
 wherein the illumination source couples to the lens holder and is directed towards the image sensor.

3. The information handling system of claim 2 wherein the illumination source comprises plural red light emitting diodes (LEDs) having a predetermined luminance associated with blinding the image sensor from capturing visual images of light directed through the lens.

4. The information handling system of claim 2 wherein the illumination source comprises red organic light emitting diode (OLED) material.

5. The information handling system of claim 1 wherein the illumination source comprises a red LED configured to direct illumination at the light diffuser.

6. The information handling system of claim/wherein the light diffuser comprises a sheet of acrylic.

7. The information handling system of claim 1 wherein the predetermined condition comprises the camera in a privacy mode not authorized to capture visual images, the instructions further retracting the light diffuser when the camera is authorized to capture visual images.

8. The information handling system of claim 1 wherein the illumination source comprises a red OLED material configured to direct illumination towards the light diffuser.

9. A method for managing camera privacy, the method comprising:
 capturing visual images at the camera with light directed through a lens towards an image sensor;
 detecting a predetermined condition;

in response to the predetermined condition, illuminating an illumination source between the lens and image sensor to impede capture of the visual images by the image sensor;

in response to the predetermined condition, extending a light diffuser between the lens and the image sensor to impede light directed through the lens towards the image sensor; and directing the illumination of the illumination source towards the light diffuser.

10. The method of claim 9 further comprising:
coupling the lens in a position relative to the image sensor with a lens holder; and
coupling the illumination source to the lens holder to direct the illumination at the image sensor.

11. The method of claim 10 wherein the illumination source comprises a red light emitting diode (LED).

12. The method of claim 9 wherein the illumination source comprises a red LED and the light diffuser comprises a sheet of acrylic.

13. The method of claim 9 further comprising:
detecting authorized use of the camera; and
in response to the detecting authorized use of the camera, turning off the illumination source and retracting the light diffuser from impeding the light directed through the lens towards the image sensor.

14. A camera comprising:
a lens operable to direct light;
an image sensor aligned with the lens to receive the light and to capture a visual image from the light;
an illumination source positioned between the lens and the image sensor;
a light diffuser having a planar shape and sized to impede light passing from the lens to the image sensor;
an actuator coupled to the light diffuser and operable to selectively extend the light diffuser to an impeding position between the lens and image sensor and to retract the light diffuser from the impeding position;
a processing resource; and
a non-transient memory storing instructions that when executed on the processing resource cause the illumination source to illuminate in response to a predetermined condition thereby impeding the image sensor from capture of the visual image from the light directed through the lens towards the image sensor and causes the actuator to extend the light diffuser to the impeding position in response to the predetermined condition.

15. The camera of claim 14 further comprising:
a lens holder coupled to the lens to hold the lens at a predetermined position relative to the image sensor;
wherein the illumination source couples to the lens holder and is directed towards the image sensor.

16. The camera of claim 14 wherein the predetermined condition comprises the camera in a privacy mode not authorized to capture visual images, the instructions further retracting the light diffuser when the camera is authorized to capture visual images.

17. The camera of claim 14 wherein the illumination source comprises a red light emitting diode aligned to illuminate into the light diffuser.

* * * * *